2,244,515

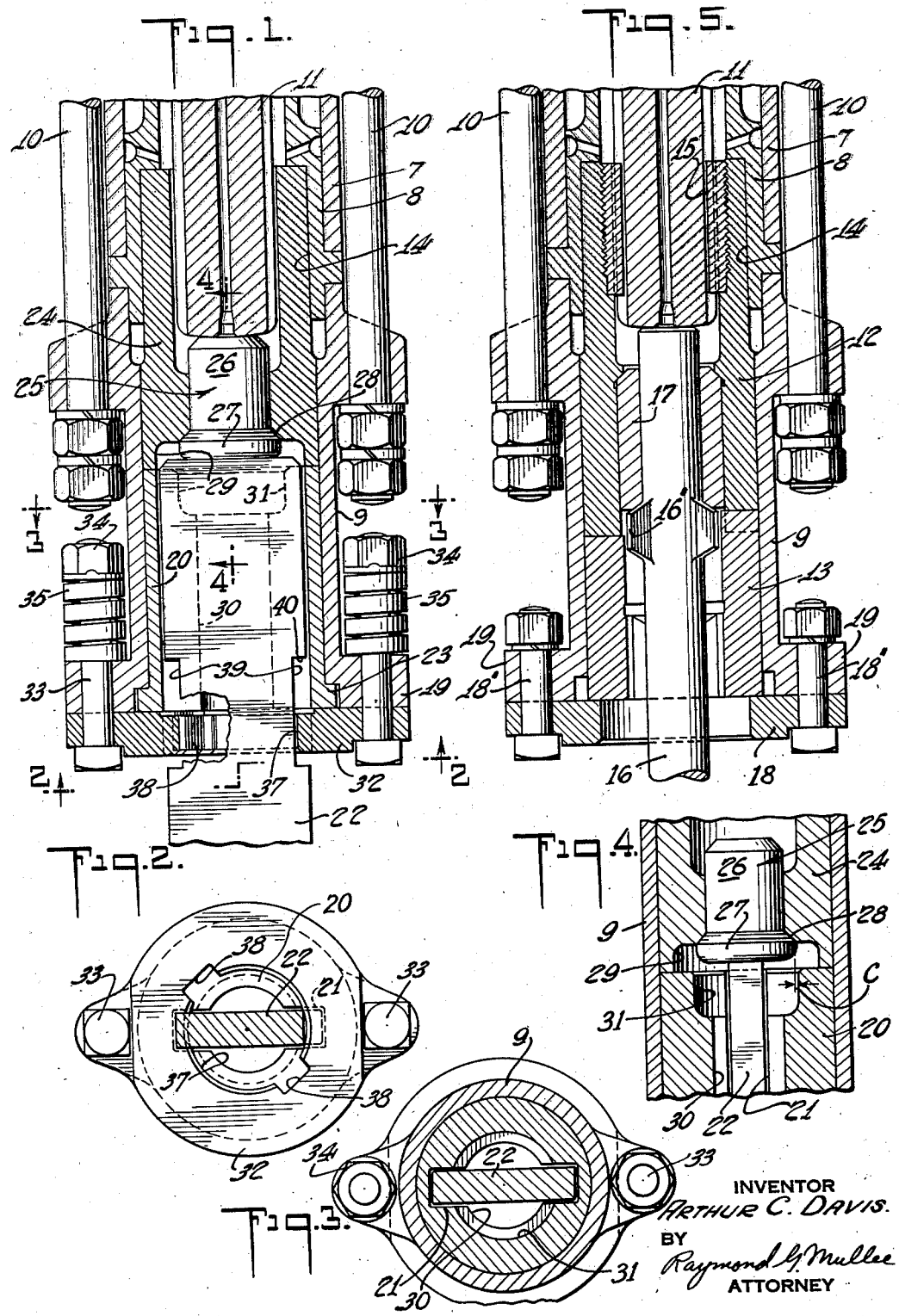
June 3, 1941. A. C. DAVIS 2,244,515
HOLDER FOR IMPACT TOOLS
Filed Aug. 31, 1938
INVENTOR
ARTHUR C. DAVIS
BY
Raymond G. Mullee
ATTORNEY Patented June 3, 1941

UNITED STATES PATENT OFFICE 2,244,515

HOLDER FOR IMPACT TOOLS

Arthur C. Davis, Detroit, Mich., assignor to Chicago Pneumatic Tool Company, New York, N. Y., a corporation of New Jersey Application August 31, 1938, Serial No. 227,606

6 Claims. (Cl. 279—19.3)

This invention relates to percussive tools and more particularly to a holder for a broaching steel, adapted to be mounted in the front end of a conventional rock drill of the hammer type.

An object of the invention is the provision of a broaching tool chuck arrangement of simple and durable construction.

Another object is to prevent the broaching steel from becoming stuck in the holder as a result of the action of the impacting member in upsetting the end of the steel.

A further object is the provision of a retainer for locking the broaching steel in the holder, thereby preventing accidental removal of the steel and permitting the operator conveniently to withdraw the steel from the rock.

Other objects will appear more clearly from the following description taken in connection with the accompanying drawing and appended claims.

In the accompanying drawing wherein like reference numerals indicate like parts:

Fig. 1 is a longitudinal section of a tool holder embodying the invention, parts of the tool or broaching steel being broken away;

Fig. 2 is a cross section through the broaching steel looking rearwardly as indicated by the arrows 2 is Fig. 1;

Fig. 3 is a cross section through the broaching steel and tool holder looking forwardly as indicated by the arrows 3 in Fig. 1;

Fig. 4 is a fragmentary longitudinal section as indicated by the arrows 4 in Fig. 1; and Fig. 5 is a sectional view similar to Fig. 1, showing the front end of a conventional rock drill having parts common to those illustrated in Figs. 1 to 4 and other parts adapted to be replaced for converting the rock drill into a broaching machine.

Referring first to Fig. 5, the usual rock drill comprises a cylinder 7, a cylinder bushing 8, and a front head 9 secured to the cylinder by means including side bolts 10, a piston 11 reciprocable in the cylinder, and rotation mechanism (not shown) for effecting step-by-step turning movement of the piston.

When it is desired to use the drill for actuating a drill steel, the front head 9 serves as a housing for the chuck mechanism including a chuck sleeve 12 and chuck 13. The rear end of the chuck sleeve is mounted for rotation in a counterbore 14 in the rear end of the cylinder bushing 8 and is secured to a chuck nut 15 having a splined connection with the piston 11 whereby the rotary movement of the piston is imparted to the chuck sleeve. The forward part of the chuck sleeve 12 is rotatably mounted in the front head 9 and has a driving connection with the chuck 13 which is also rotatable in the front head. A drill steel 16 is supported by a chuck bushing 17 mounted in the forward end of chuck sleeve 12 and receives impacts delivered by the piston 11. The drill steel has lugs 16' cooperating with ribs on the chuck 13 by means of which the drill steel is rotated. The chuck 13 is retained in the front head 9 by a retainer plate 18 secured by bolts 18' to a flange 19 on the front extremity of the front head.

Referring now to Figs. 1 to 4 inclusive, the chuck mechanism provided for the accommodation of a broaching steel comprises a chuck 20 having cylindrical outer surfaces and having a rectangular shaped opening or slot 21 which receives and positions the broaching steel 22. The broaching steel is rectangular in cross section and is of such size relative to the opening 21 that a slight clearance is provided at its sides and ends. Broaching tool chuck 20 is provided with a flange 23 seating against the bottom of a counterbore in the front head 9 whereby the front head absorbs the end thrust of the chuck.

Abutting the chuck 20 at its rear end, is an anvil block bushing 24 rotatably mounted in chuck cylinder bushing 8 and front head 9. The anvil block bushing is not provided with splines to engage the piston 11, and therefore the piston does not impart rotation to the anvil block bushing or chuck, as it is desirable that the broaching steel be free to float in order to align itself with the holes in the rock. An anvil block 25 is mounted for limited reciprocation in bushing 24 and has a stem portion 26 receiving impacts from the hammer piston 11, a head 27 adapted to strike the rear end of the broaching steel 22, and a shoulder 28 engageable with a correspondingly shaped portion of the anvil block bushing to limit rearward movement of the anvil block. The front end of the anvil block bushing 24 is provided with a counterbore 29 surrounding the anvil block head 27, a portion of said counterbore being positioned to receive the broaching steel 22 and permit the latter to rotate therein.

Chuck 20 has a central bore 30 extending from the front extremity of the chuck and terminating in a counterbore or recess 31 at the rear end. Recess 31 is adapted to receive the anvil block head 27 with a clearance space C therebetween. The diameter of the anvil block head 27 is considerably less than the width of the broaching steel 22 in order to prevent the outer edges of the steel from spreading and becoming bound in the chuck 20. The diameter of the chuck bore 30 is large enough to provide clearance space for the impact receiving end of the broaching steel should the central portion thereof become beaded or upset under the hammering action of the anvil block, thereby to permit the broaching steel to be withdrawn from the chuck. The clearance space C between the anvil block head 27 and the chuck recess 31 prevents the anvil block from becoming frozen in the chuck due to scoring of the side walls of the slot 21 by lateral movement of the broaching steel, as might occur in prior constructions in which the anvil block has a sliding fit with the chuck.

A retainer plate 32 abuts against the end of the front head flange 19 and chuck 20 to retain the latter in the front head 9. A pair of bolts 33 pass through openings in the front head 19 and plate 32 and are provided at their rear ends with nuts 34. Springs 35, interposed between the nuts and flange, provide a yielding support for the retainer plate. Plate 32 also serves as a steel puller or retainer member for the broaching steel 22. For this purpose the plate is provided with a central bore 37 of smaller diameter than the maximum width of the broaching steel and with an intersecting slot 38 of sufficient size to permit the entire broaching steel to pass therethrough. The broaching steel is provided with a pair of recesses or grooves 39 which may be formed by grinding.

The broaching steel 22 is inserted through the slot 38 until the grooves 39 register with the slot, and then turned, in the manner of a bayonet connection, out of the plane of the slot 38. Should the piston 11 be permitted to deliver impacts while the broaching steel is not held against the rock, the shoulders 40 at the rear ends of the broaching steel grooves 39 will strike the retainer plate 32 and prevent the broaching steel from being projected out of the chuck. The springs 35 absorb the shocks thus transmitted to the plate 32.

Preferably the retainer plate slots 38 are disposed at an angle of 45° relative to the plane which passes through the side bolts 10 and retainer bolts 38, since the broaching steel is normally supported either in said plane or at right angles thereto, especially when the drilling machine is supported on a wagon mounting, and the chuck in operation ordinarily will not rotate 45° away from the normal position. If desired, the same retainer plate 32 and associated bolts and springs may be employed when the broaching machine is converted into a rock drill of the type illustrated in Fig. 1.

What is claimed is:

1. In a percussive tool, a front head, a one-piece chuck rotatably mounted in said front head, means preventing axial movement of the chuck relative to the front head, said chuck having a polygonal opening to receive a working tool, an anvil block positioned to transmit impacts to said working tool, and means independent of said chuck for supporting said anvil block, said supporting means comprising an anvil block bushing rotatably mounted in said front head and having a sliding fit with the rear portion of said anvil block, said chuck having a circular recess at its rear end adapted to receive the front portion of said anvil block, said recess being of larger diameter than the maximum diameter of said anvil block, whereby to prevent engagement between the chuck and the periphery of the anvil block, said chuck being removable from the front head by movement in a forward direction and said anvil block being removable from the anvil block bushing by movement in a forward direction.

2. In a percussive tool, a front head, an anvil block positioned to receive impacts delivered by a hammer piston or like element, an anvil block bushing having a bore in which said anvil block is slidably mounted, said anvil block having a shoulder engageable with said anvil block bushing to limit rearward movement of the anvil block and having a head forwardly of said shoulder, a one-piece chuck in front of said anvil block bushing, said chuck having a rectangular slot extending from end to end thereof, the rear end of the chuck having a recess adapted to receive said anvil block head, said chuck having an axial bore of smaller diameter than said recess extending from latter to the front extremity of the chuck, a broaching steel of rectangular cross section mounted for reciprocation in the chuck slot and adapted to extend beyond the rear extremity of the chuck, the front end of said anvil block bushing contacting said chuck and being provided with a recess into which said broaching steel may extend, the exterior of the chuck having smooth cylindrical surfaces of different diameters adapted to fit and rotate within corresponding surfaces on the front head, the surface of larger diameter being formed on a flange integral with the chuck, said flange having a rear shoulder engaging the front head, whereby the front head sustains rearward thrusts of the chuck, and means for retaining the chuck against forward movement relative to the front head, said retaining means comprising a retainer plate abutting the front ends of the chuck and front head, and having an opening permitting passage of the broaching steel therethrough, and securing elements connecting said plate to the front head.

3. In a percussive tool, a front head, a chuck rotatably mounted in said front head, said chuck having an opening therethrough to slidably receive a working tool and position the tool for receiving impacts, said front head having a flange at its front extremity, a plate abutting against the front extremity of the chuck and having a central opening to permit movement of the working tool therein, resilient means supported by said front head flange for holding the plate in engagement with the front extremity of the chuck, and means for limiting rearward movement of said chuck, said means including a flange formed on the front extremity of said chuck and a cooperating recess formed in the front extremity of said front head.

4. In a percussive tool, a front head, a one-piece chuck rotatably mounted in said front head, said chuck having a polygonal opening to receive a working tool, an anvil block positioned to receive impacts and to deliver impacts to said working tool, and means independent of said chuck for supporting said anvil block, said supporting means comprising an anvil block bushing having a sliding fit with the rear portion of said anvil block, said chuck having a cylindrical recess at its rear end adapted to receive the front portion of said anvil block, the front end of said recess being engageable with the front end of the anvil block to limit forward movement of the latter, a flange on said chuck engageable with the front head to prevent rearward movement of the chuck, and shock absorbing means comprising a plate supported by said front head and engageable with the front end of the chuck, and resilient means urging said plate rearwardly.

5. In a percussive tool, a front head; a chuck mounted for rotation therein, said chuck having a rectangular slot therethrough; a broaching steel of rectangular cross section mounted to reciprocate in said slot with a loose fit; means for delivering impacts to the rear end of said broaching steel; and means for retaining said broaching steel and chuck in the front head, said retaining means comprising a plate secured to the front head and abutting the front extremity of the chuck, a pair of reduced portions on opposite sides of the broaching steel, said reduced portions terminating at their upper ends in shoulders, said plate having a cylindrical opening at its center of a diameter greater than the width of said reduced portion of the broaching steel but less than the width of the rear end of the broaching steel, said plate having diametrically opposed recesses communicating with said cylindrical opening to permit passage of the rear end of the broaching steel therethrough, said broaching steel being adapted to be turned out of alignment with said recesses, whereby said shoulders may strike the plate to prevent removal of the broaching steel from the chuck, and a pair of side bolts passed through said plate and secured to said front head for holding said plate in engagement with the front extremity of said chuck.

6. In a percussive tool, a front head; a chuck mounted for rotation therein, said chuck having a rectangular slot therethrough; a broaching steel of rectangular cross section mounted to reciprocate in said slot with a loose fit; means for delivering impacts to the rear end of said broaching steel; and means for retaining said broaching steel and chuck in the front head, said retaining means comprising a plate secured to the front head and abutting the front extremity of the chuck, a pair of reduced portions on opposite sides of the broaching steel, said reduced portions terminating at their upper ends in shoulders, said plate having a cylindrical opening at its center of a diameter greater than the width of said reduced portion of the broaching steel but less than the width of the rear end of the broaching steel, said plate having diametrically opposed recesses communicating with said cylindrical opening to permit passage of the rear end of the broaching steel therethrough, said broaching steel being adapted to be turned out of alignment with said recesses, whereby said shoulders may strike the plate to prevent removal of the broaching steel from the chuck, and shock absorbing means interposed between said plate and front head to permit limited forward movement of the plate in response to impacts delivered by the broaching steel shoulders.

ARTHUR C. DAVIS

CERTIFICATE OF CORRECTION.

Patent No. 2,244,515. June 3, 1941.

ARTHUR C. DAVIS.

It is hereby certified that error appears in the printed specification of the above numbered patent requiring correction as follows: Page 2, first column, line 48, for "bolts 38" read --bolts 33--; page 3, first column, line 14, claim 5, for "oppo-" read --opposite--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.